United States Patent
Nelson et al.

(10) Patent No.: US 9,440,588 B2
(45) Date of Patent: Sep. 13, 2016

(54) ELECTRO-OPTIC MIRROR SYSTEM AND METHOD THEREOF

(71) Applicant: Gentex Corporation, Zeeland, MI (US)

(72) Inventors: Barry K. Nelson, Howard City, MI (US); David J. Schmidt, Holland, MI (US); Gregory J. Nagel, Byron Center, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/204,690

(22) Filed: Mar. 11, 2014

(65) Prior Publication Data

US 2014/0268281 A1    Sep. 18, 2014

Related U.S. Application Data

(60) Provisional application No. 61/779,694, filed on Mar. 13, 2013.

(51) Int. Cl.
*G02F 1/153* (2006.01)
*B60R 1/08* (2006.01)
*B60R 1/12* (2006.01)

(52) U.S. Cl.
CPC ............ *B60R 1/088* (2013.01); *B60R 1/12* (2013.01); *B60R 2001/1223* (2013.01)

(58) Field of Classification Search
CPC .. B60R 1/12; B60R 2001/1223; B60R 1/088

USPC .............. 359/265–275, 245, 296; 345/105
See application file for complete search history.

(56) References Cited

U.S. PATENT DOCUMENTS

| | | | |
|---|---|---|---|
| 6,057,956 A | 5/2000 | Ash et al. | |
| 6,111,683 A | 8/2000 | Cammenga et al. | |
| 6,166,848 A * | 12/2000 | Cammenga et al. | 359/267 |
| 7,906,756 B2 | 3/2011 | Drummond et al. | |
| 8,786,704 B2 * | 7/2014 | Foote et al. | 348/148 |

OTHER PUBLICATIONS

Patent Cooperation Treaty, International Searching Authority, International Search Report, Written Opinion of the International Searching Authority and Notification of Transmittal, Jul. 16, 2014, 6 Pages.

* cited by examiner

*Primary Examiner* — Tuyen Tra
(74) *Attorney, Agent, or Firm* — Price Heneveld LLP; Bradley D. Johnson

(57) ABSTRACT

A system is configured to reduce glare form a trailing vehicle. The system may include a forward facing light sensor, partially enclosed in an interior mirror housing. This forward facing light sensor is configured to detect ambient light, such that the system can determine a day time condition or a nighttime condition. The system may also include rear facing light sensors, each included in separate mirror assemblies. Based upon an ambient light detected and a glare of a trailing vehicle, the system may be configured to change the reflectance of an electro-optic element in order to reduce glare independently in the separate mirror assemblies.

15 Claims, 4 Drawing Sheets

ELECTRO-OPTIC MIRROR SYSTEM AND METHOD THEREOF

CROSS-REFERENCE TO RELATED APPLICATIONS

This application claims priority to and the benefit under 35 U.S.C. §119(e) of U.S. Provisional Patent Application No. 61/779,694, filed on Mar. 13, 2013, entitled "ELECTRO-OPTIC MIRROR SYSTEM AND METHOD THEREOF," the entire disclosures of which are hereby incorporated herein by reference.

FIELD OF THE INVENTION

The present invention generally relates to a rearview mirror system, and more particularly, an electro-optic rearview mirror system.

SUMMARY OF THE INVENTION

According to one aspect of the present invention, a system is configured to reduce glare from a trailing vehicle. The system includes a forward facing light sensor, partially enclosed in an interior mirror housing. The forward facing light sensor is configured to detect ambient light, such that the system can determine a day time condition or a nighttime condition. The system also includes a plurality of rear facing glare sensors or light sensors each included in separate mirror assemblies. Based on a detected glare of a trailing vehicle, the system is configured to change a reflectance of an electro-optic element in each mirror module assembly to reduce glare.

According to another aspect of the present invention, an exterior electro-optic mirror assembly is configured for use with a vehicle. The exterior electro-optic mirror assembly may include a first substrate and a second substrate approximately parallel to the first substrate. The first and second substrates may define a cavity configured to receive an electro-optic element. A first light sensor may be configured to detect light and have a field of view at least partially rearward of the vehicle. A processor may be configured to receive an input signal from a second light sensor. The processor may be further configured to control an electrical power supplied to the electro-optic element in response to a light detected by the light sensor and the received input from the second light sensor.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

The present illustrated embodiments reside primarily in combinations of method steps and apparatus components related to an electro-optic mirror system. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings may represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such a process, method, article, or apparatus. An element preceded by "comprises . . . a" does not, without more constraints, preclude the existence of additional identical elements in the process, method, article, or apparatus that comprises the element.

Figure 1:
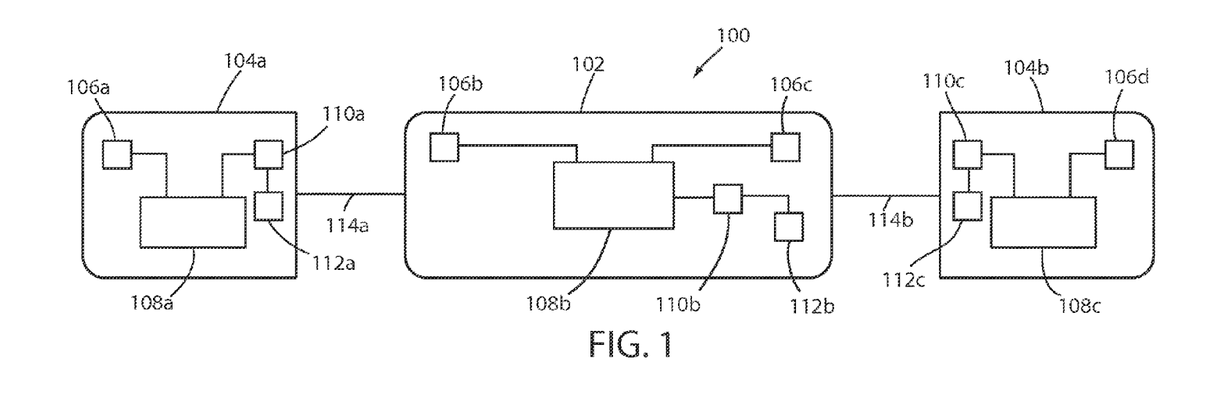
FIG. 1 is block diagram of the electro-optic rearview system, in accordance with one embodiment of the present invention.

In reference to FIG. 1, an electro-optic mirror system is generally shown at reference to 100. The system 100 may comprise a first mirror assembly 102, for example an electro-optic interior mirror assembly. The system 100 may further comprise a second mirror assembly 104a and a third mirror assembly 104b. The second mirror assembly 104a and the third mirror assembly 104b may comprise a driver's side exterior mirror assembly and a passenger's side exterior mirror assembly, respectively.

Each of the mirror assemblies 102, 104a, 104b may include a rear facing light sensor 106a, 106b, 106d that is configured to detect a light received, for example glare light. The glare light may correspond to light emitted from at least one headlight of one or more trailing vehicles. Each of the rear facing light sensors 106a, 106b, 106d may be configured to be in communication with a processor 108a, 108b, 108c in each of the mirror assemblies 102, 104a, 104b. In response to the light received, each of the rear facing light sensors 106a, 106b, 106d may communicate a signal to each of the respective processors 108a, 108b, 108c.

The processors 108a, 108b, 108c may be operable to determine a light intensity from each of the signals received from the rear facing light sensors 106*a*, 106*b*, 106*d*. Each of the processors 108*a*, 108*b*, 108*c* may further be in communication with and operable to control a drive circuitry 110*a*, 110*b*, 110*c* of each of the mirror assemblies 102, 104*a*, 104*b*. Each drive circuitry 110*a*, 110*b*, 110*c* may further be in electrical communication with a variable reflectance mirror element 112*a*, 112*b*, 112*c* of each of the mirror assemblies 102, 104*a*, 104*b*. In response to a control signal from each of the processors 108*a*, 108*b*, 108*c*, the drive circuitry 110*a*, 110*b*, 110*c* may control a reflectance level of each of the variable reflectance mirror elements 112*a*, 112*b*, 112*c*. In response to the control signals from of the respective processors 108*a*, 108*b*, 108*c*, each of the variable reflectance mirror assemblies 102, 104*a*, 104*b* may be operable to independently change in reflectance level.

For example, a first rear facing light sensor 106*a* may detect a glare light and communicate a signal corresponding to the glare light to the processor 108*a*. In response to the signal, the processor 108*a* may be operable to determine an intensity of the glare light. Based on the intensity of the glare light, the processor 108*a* may control a reflectance or level of reflectance of the variable reflectance mirror element 112*a*. To control the reflectance of the variable reflectance mirror element 112*a*, the processor 108*a* may send a control signal to the drive circuitry 110*a*. In response to the control signal, the drive circuitry may be operable to control the level of reflectance of the variable reflectance mirror element 112*a* based on the glare light detected by the rear facing light sensor 106*a*.

At least one of the mirror assemblies 102, 104*a*, 104*b* (e.g., the interior rearview mirror assembly 102) may further include a fourth light sensor, for example a forward facing light sensor 106*c*. The forward facing light sensor 106*c* may generally face a forward direction with respect to a normal operating direction of a vehicle. The forward facing light sensor 106*c* may be configured to receive ambient light, such that the system 100 may determine an environmental lighting condition. An environmental lighting condition may comprise any lighting condition and may generally correspond to a light emitted from a light source above or somewhat forward from a vehicle. For example, an environmental lighting condition may comprise an ambient light intensity such as a daytime lighting condition or a nighttime lighting condition.

The forward facing light sensor 106*c* may also be in electrical communication with one or more of the processors 108*a*, 108*b*, 108*c*. In an exemplary implementation, the forward facing light sensor 106*c* may be incorporated in the interior mirror assembly 102 and in communication with the processor 108*b*. The processor 108*b* of the interior mirror assembly 102 and the processors 108*a*, 108*c* of the exterior mirror assemblies 104*a*, 104*b* may further be operable to communicate via data links 114*a*, 114*b*. The data links 114*a*, 114*b* may be operable to communicate an ambient light signal or a control signal to each of the processors 108*a*, 108*c* from the forward facing light sensor 106*c* or the processor 108*b*.

In one particular example, a signal based upon the light received by the forward facing light sensor 106*c* may be implemented by each of the processors 108*a*, 108*b*, 108*c* in combination with a signal based on the light or glare light received by each rear facing light sensor 106*a*, 106*b*, 106*d*. Based on the signal received corresponding to the forward facing light sensor 106*c* and signals or glare light signals received from each of the rear facing light sensors 106*a*, 106*b*, 106*d*, each of the processors 108*a*, 108*b*, 108*c* may independently control a level of reflectance of the variable reflectance mirror elements 112*a*, 112*b*, 112*c*, respectively.

Though each of the mirror assemblies 102, 104*a*, 104*b* demonstrated in this implementation comprises a processor 108*a*, 108*b*, 108*c*, a single processor may be operable to partially or entirely control the drive circuitries 110*a*, 110*b*, 110*c* for each of the variable reflectance mirror elements 112*a*, 112*b*, 112*c*. As each of the mirror assemblies 102, 104*a*, 104*b* are demonstrated as being in communication, various implementations may include processing of the various signals transmitted among the processors 108*a*, 108*b*, 108*c* by a single processor or any combination of processors within the spirit of the disclosure. For example, the processor 108*b* may determine an intensity of an ambient light from the forward facing light sensor 106*c* and communicate an ambient light signal to each of the processors 108*a* and 108*c*. The ambient light signal maybe used by the processors 108*a*, 108*c* to control a reflectance of the variable reflectance mirror elements 112*a*, 112*c*. In this way, the processors 108*a*, 108*c* may respond to a control signal (e.g. the ambient light signal) from the processor 108*b* corresponding to the ambient light detected by the forward facing light sensor 106*c*.

According to one embodiment, the communication connections 114*a*, 114*b* are one way communication links. In some implementations, the communication connections 114*a*, 114*b* are hardwire connections. However, the communication connections 114*a*, 114*b* may be implemented by any communication method operable to carry at least one communication signal. For example, the communication connections 114*a*, 114*b* may be implemented by wireless connections, such as but not limited to Wi-Fi, RF, IR, Bluetooth, the like, or any combination thereof. It should be appreciated by those skilled in the art that the communication connections 114*a*, 114*b* may be two-way connection links.

Figure 2A:
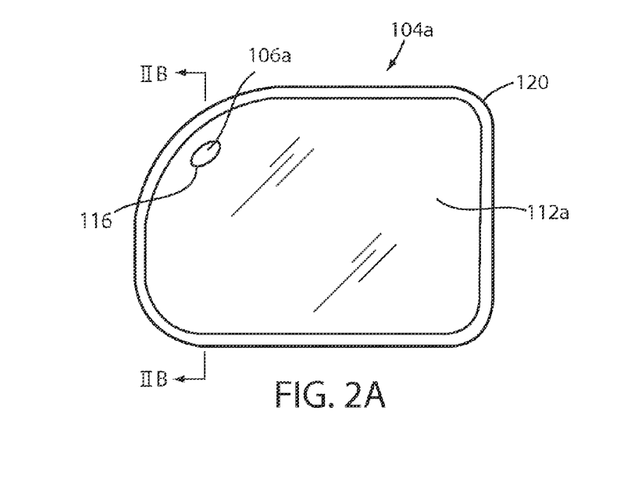
FIG. 2A is a front view of an exterior rearview mirror assembly, in accordance with one embodiment of the present invention.

Referring to an embodiment illustrated in FIG. 2A, a front view of an exterior rearview mirror assembly, for example the driver's side exterior mirror assembly 104*a* is shown. The driver's side exterior mirror assembly 104*a* may include a mirror housing 120, which is adapted to at least partially enclose the variable reflectance mirror 112*a*. The exterior rearview mirror assembly 104*a* may also include the rear facing light sensor 106*a*. The rear facing light sensor 106*a* may be placed behind at least one substrate of the mirror element 112*a*. The processor 108*a* and the drive circuitry 110*a* may also be incorporated in the driver's side exterior mirror assembly 104*a* enclosed in the mirror housing 120 behind the variable reflectance mirror 112*a*.

The at least one substrate of the mirror element 112*a* may comprise a first substrate and a second substrate that are substantially parallel. The first substrate and the second substrate may define a cavity. An electrochromic medium may be disposed in the cavity and operable to generate a variable reflectance of at least one variable reflectance element. Further details regarding electrochromic mediums as discussed herein may be found in following portions of the disclosure.

The rear facing light sensor 106*a* may be operable to detect light, for example a glare light, through a region of the variable reflectance mirror. For example, the variable reflectance mirror 112*a* may comprise a portion 116 that is configured to allow light to pass through the variable reflectance mirror 112*a* such that the rear facing light sensor may detect light passing through the portion 116. In some implementations, the portion 116 may comprise the mirror being transflective across the whole surface or a portion of the surface of the variable reflectance mirror. Further the portion 116 may comprise a window portion or a screened portion having a plurality of slits or see through portions configured to allow light to pass through variable reflectance mirror 112*a*. In these configurations, the rear facing light sensor 106*a* may be operable to detect a presence and an intensity of a glare light from a trailing vehicle.

Figure 2B:
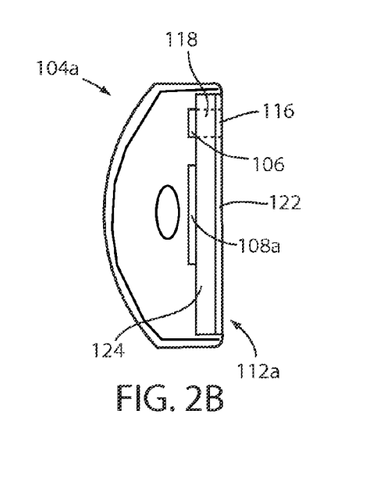
FIG. 2B is cross-sectional view of the exterior rearview mirror assembly of FIG. 2A across the line 2B-2B.

In reference to FIG. 2B a cross-sectional view of the driver's side exterior mirror assembly 104*a* is shown. The driver's side exterior mirror assembly 104*a* may generally comprise a variable reflectance surface 122 of the variable reflectance mirror 112*a*. The variable reflectance mirror 112*a* may be partially enclosed and supported by a carrier plate 124. Behind the variable reflectance surface 122, the portion 116 of the variable reflectance surface 122 may be configured to allow light to pass through a light sensor window 118. In some implementations, the rear facing light sensor 106*a* may be positioned behind the variable reflective mirror element 112*a* to protect the rear facing light sensor 106*a* from dirt and debris.

The rear facing light sensor 106*a* is configured to read a light level or an intensity of a glare light from at least one headlight of a trailing vehicle. In response to the intensity of the glare light detected by the rear facing light sensor 106*a*, the light sensor 106*a* may communicate a signal identifying the intensity to the processor 108*a*. The signal from the rear facing light sensor 106*a* may be analyzed by the processor 108*a* to determine a control signal to communicate to the control circuitry 110*a*. Based on the control signal from the processor 108*a*, the control circuitry 110*a*, may be configured to control a level of reflectance of the variable reflectance surface 122 of the variable reflective mirror element 112*a*.

In an exemplary implementation, the processor may further be operable to receive a signal from the communication connection 114*a*. The communication connection may communicate at least one ambient light signal detected by the forward facing light sensor 106*c*. In response to a combination of the signal from the rear facing light sensor 106*a*, and the forward facing light sensor 106*c*, the processor may control a level of reflectance of the variable reflectance surface 122. For example, in response to a dark or nighttime condition communicated from the forward facing light sensor 106*c* and a glare light detected by the rear facing light sensor 106*a*, the processor may decrease a reflectance level of the variable reflectance surface 122.

The various implementations of the one or more of the rear facing light sensors 106*a*, 106*b*, 106*d* discussed herein may further comprise a secondary optic that affects a field of view. For example, the rear facing light sensors 106*a*, 106*d* on the exterior mirror assemblies 104*a*, 104*b* may include secondary optics configured such that a horizontal field of view is approximately ten degrees outboard and approximately thirty-five degrees inboard with respect to an origin or optical axis of each of the respective rear facing light sensors 106*a*, 106*d*. Additionally or alternatively, the rear facing light sensors 106*a*, 106*d* of the exterior mirror assemblies 104*a*, 104*b* may be configured to monitor a vertical field of view of approximately ten degrees below and approximately fifteen degrees above a sensor origin or optical axis, for example an origin of each of the respective rear facing light sensors 106*a*, 106*d*.

The fields of view described above may correspond to each of the mirror assemblies 104*a*, 104*b*, mounted in positions such that the variable reflectance surface 122 and a coplanar sensory surface of each of the rear facing light sensors 106*a*, 106*d* is perpendicular to a vehicle and perpendicular to the road or surface on which the vehicle is resting. Hence, a center of each field of view of the rear facing light sensors 106*a*, 106*d* is approximately parallel with an aft direction of the vehicle. Though specific fields of view are discussed in detail herein, the fields of view of the rear facing light sensors 106*a*, 106*d* may vary 10-20 degrees in both the vertical and the horizontal directions within the spirit of the disclosure.

Figure 3:
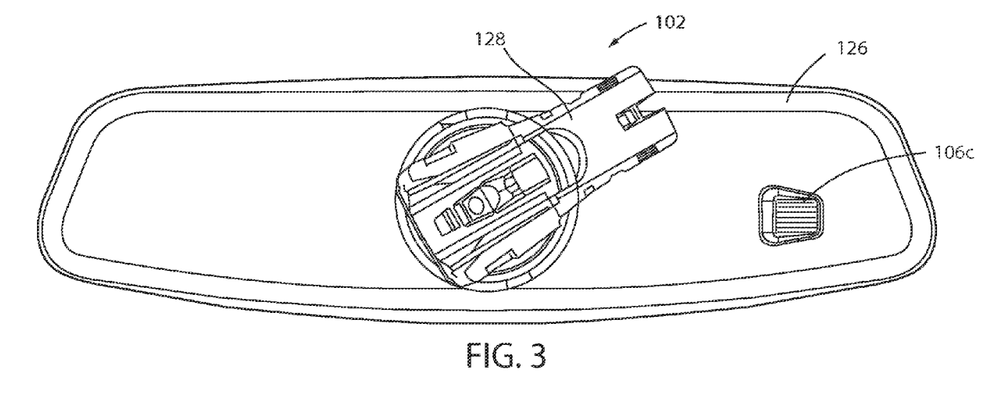
FIG. 3 is a rearview of an interior rearview mirror assembly, in accordance with one embodiment of the present invention.
Figure 4:
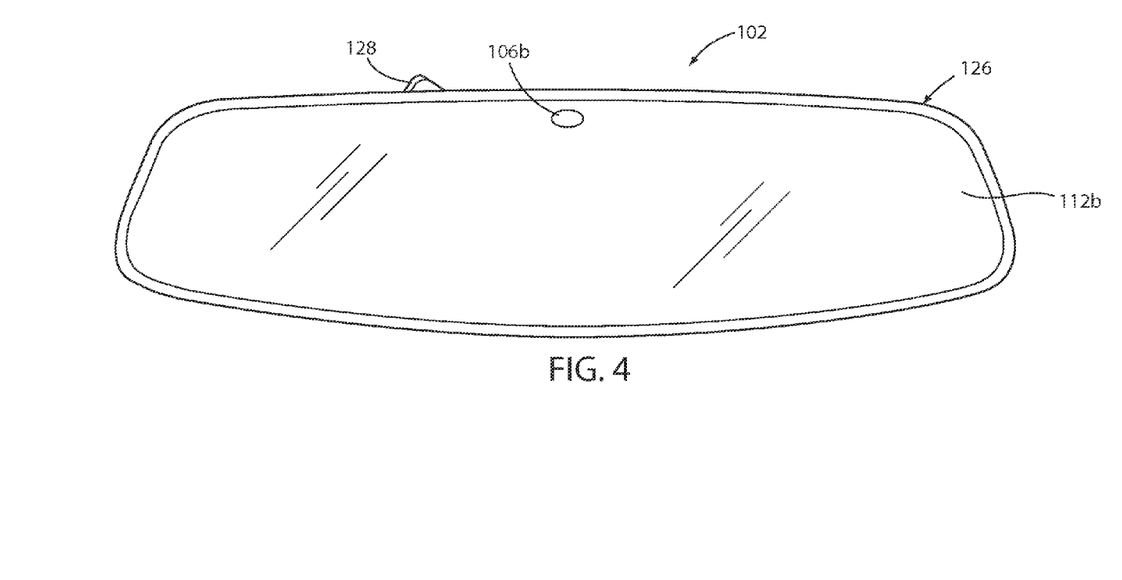
FIG. 4 is a front view of the interior rearview mirror assembly, in accordance with one embodiment of the present invention.

In reference to the implementations illustrated in FIGS. 3 and 4, the interior mirror assembly 102 may include a housing 126 adapted to at least partially enclose the variable reflectance mirror element 112*b*. The interior mirror assembly 102 may include a mount 128 configured to operably connect to a windshield or a headliner of a vehicle. The interior rearview mirror assembly 102 may further include the forward facing light sensor 106*c* incorporated in the housing 126. In some implementations, the forward facing light sensor 106*c* may be positioned in an aft location in a vehicle, for example a headliner control console to which the interior mirror assembly may be mounted. In such implementations, the forward facing light sensor 106*c* may be operable to communicate with a drive circuitry or processor of the interior mirror assembly 102.

The forward facing light sensor 106*c* may be configured to detect an environmental or ambient light condition, for example an ambient light intensity, a brightness of a lighting environment or any other exterior environmental lighting condition. An ambient light condition may comprise a driving condition, for example a day time driving condition or a nighttime driving condition. The forward facing light sensor 106*c* may further be in communication with the processor 108*b*. In response to a detection of ambient light or a level of intensity of ambient light, the forward facing light sensor 106*c* may communicate a corresponding signal to the processor 108*b*. In response to the signal corresponding to the ambient light condition, the processor 106*b* may communicate the ambient light condition such that the system 100 can determine a lighting condition. Based on the lighting condition, the system 100 may selectively adjust a reflectance of each of the variable reflectance mirror elements 112*a*, 112*b*, 112*c*.

The interior mirror assembly 102 may further comprise the rear facing light sensor 106*b*. The rear facing light sensor 106*b* may be configured to detect glare light from at least one headlight of a trailing vehicle. In operation, the forward facing light sensor 106*c* may be operable to detect an ambient light level, for example a low light level condition or nighttime driving condition. Further, the rear facing light sensor 106*b* may detect a glare light from a trailing vehicle. In response to the low ambient light condition in combination with the glare light, the processor 108*b* may control the variable reflectance mirror element 112*b* such that a reflectance of the variable reflectance mirror element 112*b* is reduced. As discussed further in reference to FIGS. 5 and 6, each of the mirror assemblies 102, 104*a*, 104*b* may respond independently to an ambient condition detected by the forward facing light sensor 106*c* and a glare light condition detected by each of the rear facing light sensors 106*a*, 106*b*, 106*d*.

Figure 5:
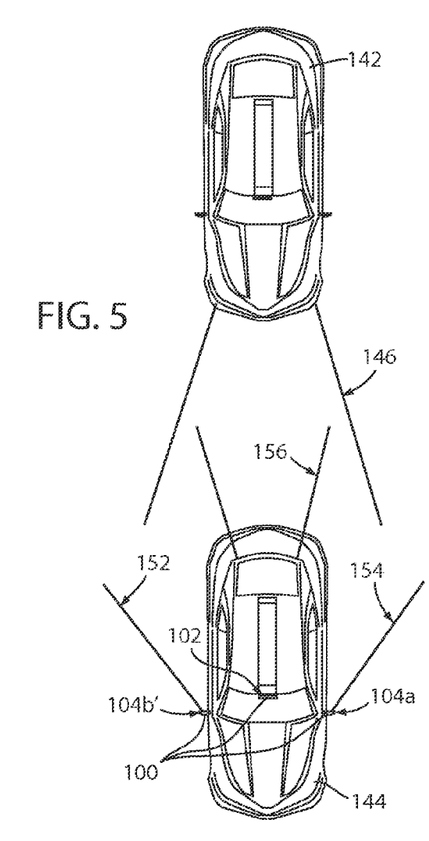
FIG. 5 is an environmental view of a vehicle comprising an electro-optic rearview mirror system, in accordance with one embodiment of the present invention.

An example of the system 100 in operation is illustrated in FIG. 5, wherein a certain amount of glare is present in the rearview mirror assemblies of a controlled vehicle that includes the system 100. Additionally, a level of ambient light or environmental lighting intensity may be detected by the forward facing light sensor 106*c*. In the examples described in reference to FIGS. 5 and 6, the forward facing light sensor may detect a low ambient light or nighttime condition. In response to the low light condition, the forward facing light sensor 106c may communicate an ambient light signal to each of the processors 108a, 108b, 108c of the rearview mirror assemblies. The ambient light signal may communicate to each of the processors 108a, 108b, 108c to activate a reduced level of reflectance in response to a glare light detected by at least one of the rear facing light sensors 106a, 106b, 106d.

In the instant example, a trailing vehicle 142 is directly behind a controlled vehicle, for example a leading vehicle 144, such that a glare 146 from at least one headlight of the trailing vehicle 142 may reach each of the rearview mirror assemblies 102, 104a, 104b of the leading vehicle 144. Each light sensor 106a, 106b, 106d may detect an amount of glare corresponding to the glare 146 from the trailing vehicle 142. In response to the amount of the glare received, a reflectance level of each of the variable reflectance mirror elements 112a, 112b, 112c may be reduced by each of the processors 108a, 108b, 108c. Based on the amount of glare received, each of the processors may independently dim the variable reflectance mirror elements 112a, 112b, 112c to reduce a reflectance level of the mirror assemblies 102, 104a, 104b. The reduction of the reflectance level may reduce the amount of glare reflected to an occupant of the leading vehicle 144.

Each of the rear facing light sensors 106a, 106b, 106d may be configured to have a field of view 152, 154, 156. Each of the fields of view 152, 154, 156 may be configured to provide for distinct dimming zones located around the leading vehicle 144. As the trailing vehicle 142 approaches the leading vehicle 144, the glare light may be received be each of the light sensors 106a, 106b, 106d in each of the respective fields of view 152, 154, 156. In response to the light received or glare light detected in each of the fields of view 152, 154, 156, each of the mirror assemblies 102, 104a, 104b may be configured to dim accordingly. In this way, the system may provide for a plurality of independent zones for varying the reflectance of the variable reflectance elements 112a, 112b, 112c.

Figure 6:
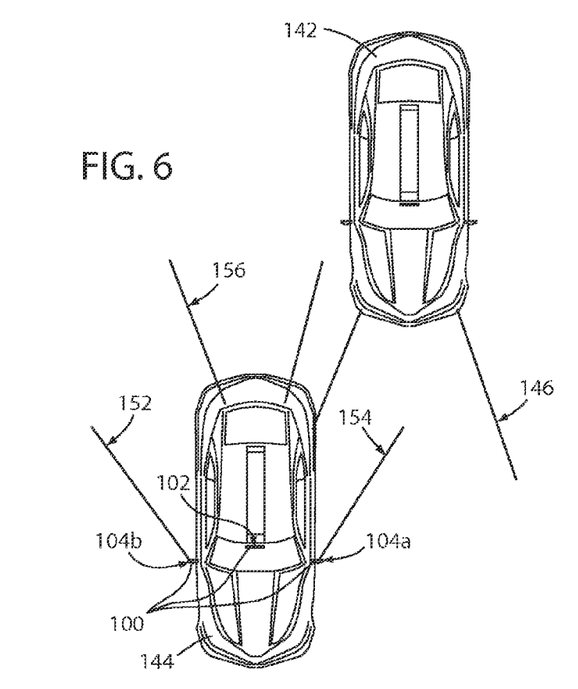
FIG. 6 is an environmental view of a passing vehicle, in accordance with one embodiment of the present invention.

An example of the system 100 in operation is also illustrated in FIG. 6, wherein there is a certain amount of glare present in at least one rearview mirror assembly of the leading vehicle 144. When the trailing vehicle 142 is passing or in an adjacent lane to the leading vehicle 144, the glare 146 from at least one headlight of the trailing vehicle 142 may partially reach each rearview mirror assembly 102, 104a, 104b. In this example, the rearview mirror assembly 104a may detect a first level of glare light, the rearview mirror assembly 102 may detect a second level of glare light, and the rearview mirror assembly 104b may detect a third level of glare light. That is, each rear facing light sensor 106a, 106b, 106d may receive a different level of glare light from the trailing vehicle 142.

In response to the each of the levels of glare light detected, each of the processors 108a, 108b, 108c may initiate a change in a reflectance level of each of the variable reflectance mirror elements 112a, 112b, 112c. Each of the rear facing light sensors 106a, 106b, 106d may communicate a signal to the processors 108a, 108b, 108c. The processors 108a, 108b, 108c may respond to the signals by causing the drive circuitry 110a, 110b, 110c to decrease a reflectance of each of the respective variable reflectance mirror elements 112a, 112b, 112c. Decreasing or dimming the reflectance of the variable reflectance mirror elements 112a, 112b, 112c may reduce an amount of glare from the trailing vehicle to improve visibility of a driver of the leading vehicle 144.

As discussed previously, each of the rear facing light sensors 106a, 106b, 106d is shown having a different field of view 152, 154, 156. As the trailing vehicle 142 passes the leading vehicle 144, the glare 146 may be unevenly distributed in each field of view 152, 154, 156. In response to a level of glare detected by each of the rear facing light sensors 106a, 106b, 106d, each mirror 102, 104a, 104b may be configured to dim accordingly. For example, the mirror assembly 104a and the corresponding rear facing light sensor 106a may receive a first level of the glare 146 in the field of view 154. The interior mirror assembly 156 and the corresponding rear facing light sensor 106b may receive a second level of the glare 146 in the second field of view 156. The first level and the second level of the glare 146 may be different in intensity.

In response to the first level of the glare 146 detected, the variable reflectance mirror element 112a may be reduced to a first reduced reflectance level. In response to the second level of the glare 146 detected, the variable reflectance mirror element 112b may be reduced to a second reduced reflectance level. Additionally, the mirror assembly 104a and the corresponding rear facing light sensor 106d may not detect or receive any level of the glare 146. In this example, the first reduced reflectance may be reduced more than the second reduced reflectance. Further, a reflectance of the variable reflectance mirror element 112c, may not be reduced due to a lack of light detected corresponding to the glare 146. In this way, the system 100 may independently control a reflectance level of each of the variable reflectance mirror elements 112a, 112b, 112c.

Figure 7:
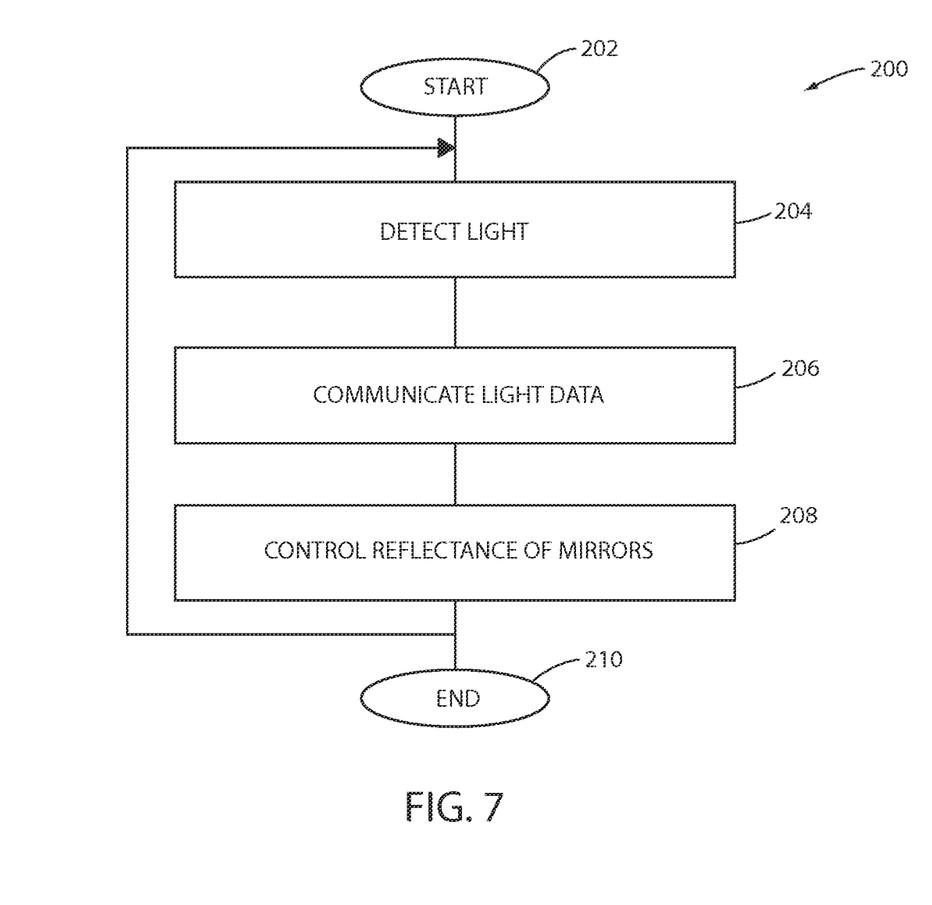
FIG. 7 is a flow chart illustrating a method of controlling a rearview mirror assembly, in accordance with one embodiment of the present invention.

In reference to FIG. 7, a method for controlling an electro-optic rearview mirror system is generally shown at reference identifier 200. The method 200 starts at step 202 and proceeds to step 204, wherein light is detected. Typically, ambient light is detected by the forward facing light sensor 106c, and glare light (e.g., light from a trailing vehicle) is detected by the rear facing light sensors 106a, 106b, 106d. At step 206 data corresponding to the detected ambient light is communicated to the processors 108a, 108b, 108c in the form of an ambient light signal. Further, the data corresponding to the glare light detected by each of the rear facing light sensors 106a, 106b, 106d, is communicated to each of the respective processors 108a, 108b, 108c.

At step 208, each of the processors 108a, 108b, 108c may control the reflectance of each of the respective variable reflectance mirror elements 112a, 112b, 112c. In response to the data corresponding to the ambient light and the glare light, each of the processors 108a, 108b, 108c may independently determine an appropriate reflectance level for each of the variable reflectance mirror elements 112a, 112b, 112c. For example, processor 108a may receive data communicating a low ambient light level and a high level of glare light. In response to the low ambient light level and the high level of glare light, the processor 108a may reduce a reflectance of the variable reflectance mirror element 112a to an appropriate level. The method 200 may continue throughout operation of the vehicle and may end at step 210. By independently varying the reflectance of a plurality of variable reflectance mirror elements, the system and methods disclosed herein may provide for a vehicle occupant to receive a safe and comfortable amount of glare light reflected from mirror assemblies on a vehicle.

The systems and methods discussed herein may provide for an interior mirror assembly (e.g. 102) and exterior mirror assemblies (e.g. 104a, 104b) that are operable to determine and control a reflectance of a plurality of variable reflectance mirror elements. Ambient light data received from a forward facing light sensor of an interior mirror assembly and glare light data received from a plurality of rear facing light sensors may be communicated to a plurality of processors to determine a level of reflectance of the plurality of variable reflectance mirror elements. According to one embodiment, an ambient light signal from the forward facing light sensor is communicated to exterior rearview mirror assemblies. However, one having ordinary skill in the art should appreciate that a processor corresponding to the interior mirror assembly (e.g. 108b) may be configured to receive and process the ambient light data such that an ambient light signal representative of an detected ambient light condition is communicated from a processor of the interior rearview mirror assembly to the exterior rearview mirror assemblies.

Ambient light levels, glare light levels, and reflectance levels discussed herein may be referred to as appropriate, safe, reduced, high, low, etc. In each of the illustrative examples described herein, these terms may each refer to various quantifiable levels based on a resolution of the system 100 for a particular application. For example, a rear facing light sensor may be operable to detect a first plurality of levels of light (e.g. glare light). A forward facing light sensor may be operable to detect a second plurality of levels of light (e.g. ambient light). Also, a variable reflectance mirror element may be operable to adjust a reflectance of variable reflectance mirror element among a third plurality of levels in response to a glare light level and an ambient light level. The various levels as discussed herein may comprise ranges measuring levels from 1-2, 1-3 (low, medium, high), 1-5, 1-10, 1-100, etc., wherein various levels may be evenly distributed over a specific range.

Based on detected ambient light levels and glare light levels at least one processor may be operable to determine a reflectance level for a variable reflectance mirror element of a mirror assembly. The at least one processor may determine the reflectance level via a process, such as a logic based process, lookup process, etc. Input levels corresponding to ambient light levels and glare light levels may be stored one or more tables and or matrices in a memory such that a processor may access the input levels to determine an output level (e.g. a reflectance level). In some implementations, at least one processor may also be operable to determine a reflectance level based on an algorithm or a plurality of analog ranges of ambient light levels and glare light levels received. The processing steps and particular processors described herein may be accomplished and implemented through a variety of methods and systems, some of which are discussed herein. The specific processors and processing methods may vary within the spirit of this disclosure.

In some implementations, the disclosure may provide for one central ambient sensor forward facing in an interior mirror assembly to reduce a potential for malfunction (or inaccurate detection) during city driving due to street lamps. According to one embodiment, having an ambient light sensor pointing horizontal to an operating plane of a vehicle rather than at an upward angle may reduce a potential that sunlight and overhead street lights are received by the light sensor during city driving. By incorporating rear facing light sensors on each mirror assembly, each of the interior and the exterior mirrors may dim to an appropriate reflectance based upon an amount of glare detected.

The systems and methods discussed herein may be advantageous in that they provide a plurality of rear facing light sensors. The disclosed systems may be less likely to malfunction due to an obstruction because of the plurality of rear facing light sensors. The plurality of rear facing light sensors may provide a plurality of fields of view to reduce a likelihood of obstructions that may adversely affect the operation of the systems discussed herein. A single interior sensor may be obstructed by many obstacles such as passengers, rear seating, and privacy glass among other things.

The mirror elements 112a, 112b, 112c may be implemented using a variety of devices. Dimming may be accomplished mechanically as described in U.S. Pat. No. 3,680,951 entitled "Photoelectrically-Controlled Rear-View Mirror" to Jordan et al.; and U.S. Pat. No. 4,443,057 entitled "Automatic Rearview Mirror For Automotive Vehicles" to Bauer et al.; each of which is incorporated herein by reference. Variable transmittance element 42 may be formed using liquid crystal cells as is described in U.S. Pat. No. 4,632,509 entitled "Glare-Shielding Type Reflector" to Ohmi et al., which is incorporated herein by reference. One or more of the mirror elements can be is an electrochromic cell which varies its transmittance in response to an applied control voltage such as is described in U.S. Pat. No. 4,902,108 entitled "Single-Compartment, Self-Erasing, Solution-Phase Electrochromic Devices, Solutions For Use Therein, And Uses Thereof" to Byker, which is incorporated herein by reference. Many other electrochromic devices may be used to implement dimming element. As will be recognized by one of ordinary skill in the art, the present invention does not depend on the type or construction of dimming element. If dimming elements include a electrochromic variable transmittance element, reflective surface may be incorporated into variable transmittance element or may be external to variable transmittance element.

The interior rearview mirror assembly 102 may include a display, which may be positioned adjacent to or behind the reflective surface of mirror element. Dimming/brightness control can also be responsive to the outputs of ambient sensors and/or glare sensors (e.g. rear facing light sensors) to control the brightness of the display.

The light sensors 106a, 106b, 106c, 106d, described herein may be implemented in various ways as disclosed in U.S. Pat. No. 7,543,946; U.S. Pat. No. 8,620,523; U.S. Patent Application Publication No. US 2012/0330504 A1; U.S. Pat. No. 9,224,889 entitled "OPTICAL ASSEMBLY FOR A LIGHT SENSOR," issued on Dec. 29, 2015, by Richard T. Fish et al.; and U.S. Pat. No. 9,207,116 entitled "LIGHT SENSOR," issued on Dec. 8, 2015 by Barry K. Nelson et al. the entire disclosures of which are incorporated herein by reference.

It will be appreciated that embodiments of the invention described herein may be comprised of one or more conventional processors and unique stored program instructions that control one or more processors to implement, in conjunction with certain non-processor circuits, some, most, or all of the functions of an Electro-optic mirror system and method thereof system, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

For purposes of the present disclosure, and as will be explained in greater detail herein below, an electrochromic medium of a variable reflectance mirror element (e.g. the variable reflectance mirror elements 112a, 112b, 112c) preferably comprises at least one solvent, at least one anodic material, and at least one cathodic material.

Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

The electrochromic medium is preferably chosen from one of the following categories:

(I) Single-layer, single-phase—The electrochromic medium may comprise a single-layer of material which may include small non-homogenous regions, and include solution-phase devices where a material may be contained in solution in an ionically conducting electrolyte which remains in solution in the electrolyte when electrochemically oxidized or reduced. Solution-phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Patent Publication No. 2002/0015214 A1 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer, such as linking of a color-stabilizing moiety, to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," which is hereby incorporated herein by reference in its entirety including all references incorporated and/or cited therein.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which is hereby incorporated herein by reference in its entirety including all references incorporated and/or cited therein.

(II) Multi-layer—The electrochromic medium may also be prepared in layers and include a material attached directly to an electrically conducting electrode or confined in close proximity thereto which remains attached or confined when electrochemically oxidized or reduced.

(III) Multi-phase—The electrochromic medium may further be prepared using multiple phases where one or more materials in the medium undergoes a change in phase during the operation of the device, for example a material contained in solution in the ionically conducting electrolyte forms a layer on the electrically conducting electrode when electrochemically oxidized or reduced.

For purposes of the present invention, anodic materials may include any one of a number of materials including ferrocene, substituted ferrocenes, substituted ferrocenyl salts, phenazine, substituted phenazines, phenothiazine, substituted phenothiazines including substituted dithiazines, thianthrene, and substituted thianthrenes. Specific examples of anodic materials which are suitable for use in accordance with the present invention, include, but are not limited to, di-tert-butyl-diethylferrocene, 5,10-dimethyl-5,10-dihydrophenazine (DM P), 3,7,10-trimethylphenothiazine, 2,3,7,8-tetramethoxy-thianthrene, 10-methylphenothiazine, tetramethylphenazine (TMP; see U.S. Pat. No. 6,242,602 B1 for synthesis, which is hereby incorporated herein by reference in its entirety), and bis (butyltriethylammonium)-para-methoxytriphenodithiazine (TPDT; see synthesis of 3,10-dimethoxy-7,14-(triethylammoniumbutyl)-triphenodithazinebis (tetrafluoroborate) in U.S. Pat. No. 6,710,906 B2, which is hereby incorporated herein by reference in its entirety). It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use in accordance with the present invention, including those disclosed in U.S.

Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 B1 entitled "Color-Stabilized Electrochromic Devices," U.S. Pat. No. 6,710,906 B2 entitled "Controlled Diffusion Coefficient Electrochromic Materials For Use In Electrochromic Mediums And Associated Electrochromic Devices," and U.S. Pat. No. 7,428,091 B2 entitled "Electrochromic Compounds and Associated Media and Devices," all of which are hereby incorporated herein by reference in their entirety including all references incorporated and/or cited therein.

For illustrative purposes only, the concentration of the anodic material(s) may range from approximately 1 millimolar (mM) to approximately 500 mM, and more preferably from approximately 2 mM to approximately 100 mM.

For purposes of the present invention, cathodic materials may include, for example, viologens, such as methyl viologen tetrafluoroborate, octyl viologen tetrafluoroborate (octylviologen), or benzyl viologen tetrafluoroborate, ferrocinium salts, such as (6-(tri-tert-butylferrocinium)hexyl) triethylammonium di-tetrafluoroborate (TTBFc+)—see U.S. Pat. No. 7,046,418 entitled "Reversible Electrodeposition Devices And Associated Electrochemical Media" for synthesis which is hereby incorporated herein by reference in its entirety. It will be understood that the preparation and/or commercial availability for each of the above-identified cathodic materials is well known in the art. See, for example, "The Bipyridinium Herbicides" by L. A. Summers (Academic Press 1980). While specific cathodic materials have been provided for illustrative purposes only, numerous other cathodic materials are likewise contemplated for use, including, but by no means limited to, those disclosed in U.S. Pat. No. 4,902,108, U.S. Pat. No. 6,188,505, U.S. Pat. No. 6,710,906 B2, as well as U.S. Pat. No. 7,855,821 B2 entitled "Electrochromic Compounds and Associated Media and Devices," all of which are hereby incorporated herein by reference in their entirety including all references incorporated and/or cited therein. Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the cathodic material(s) may range from approximately 1 millimolar (mM) to approximately 500 mM, and more preferably from approximately 2 mM to approximately 100 mM.

For purposes of the present disclosure, the electrochromic medium preferably comprises any one of a number of commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

In addition, an electrochromic medium of a variable reflectance mirror element may comprise other materials, such as light absorbers, light stabilizers, thermal stabilizers, antioxidants, thickeners, viscosity modifiers, tint providing agents, redox buffers, and mixtures thereof. Suitable redox buffers include, among others, those disclosed in U.S. Pat. No. 6,188,505 B1 entitled "Color-Stabilized Electrochromic Devices," which is hereby incorporated herein by reference in its entirety—including all continuing applications/patents claiming priority therefrom. Suitable UV-stabilizers may include: the material 2-ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An electro-optic rearview mirror system for a vehicle, the electro-optic rearview mirror system comprising:
   a first light sensor configured to detect ambient light in an approximately forward direction with respect to a normal operating direction of the vehicle;
   a first electro-optic rearview mirror assembly comprising:
      a first variable reflectance electro-optic element; and
      a second light sensor configured to detect glare light in an approximately rearward direction with respect to the normal operating direction of the vehicle;
   a second electro-optic rearview mirror assembly comprising:
      a second variable reflectance electro-optic element;
      a third light sensor configured to detect glare light in an approximately rearward direction with respect to the normal operating direction of the vehicle;
   a single processor in communication with said first light sensor, said second light sensor, and said third light sensor, wherein the second electro-optic element is operable to change reflectance in response to a signal received from the first light sensor and a signal received from the third light sensor; and
   wherein signals from the first light sensor, the second light sensor, and the third light sensor are processed in combination by the processor to independently control the reflectance level of the first variable reflectance electro-optic element and the reflectance of the second variable reflectance electro-optic element.

2. The electro-optic rearview mirror system of claim 1, wherein the first light sensor is integrated into the first electro-optic rearview mirror assembly.

3. The electro-optic rearview mirror system of claim 1, wherein the change in the second reflectance is independent of a light received by the second light sensor.

4. The electro-optic rearview mirror system of claim 1, wherein the first electro-optic element is operable to change a first reflectance in response to the first signal received from the first light sensor and a second signal received from the second light sensor.

5. The electro-optic rearview mirror system of claim 4, wherein the first reflectance is independent of the second reflectance.

6. The electro-optic rearview mirror system of claim 4, wherein the first reflectance and the second reflectance comprise a plurality of reflectance levels, the second electro-optic element being operable to change a reflectance to a plurality of reflectance levels.

7. The electro-optic rearview mirror system of claim 1, wherein the first electro-optic element is operable to change a first reflectance to a first plurality of reflectance levels in response to the first signal received from the first light sensor and a second signal received from the second light sensor.

8. The electro-optic rearview mirror system of claim 7, wherein the second electro-optic element is operable to change the second reflectance to a second plurality of reflectance levels in response to the first signal and the third signal.

9. The electro-optic rearview mirror system of claim 8, wherein the first reflectance of the first plurality of reflectance levels is independent of the second reflectance of the second plurality of reflectance levels.

10. An electro-optic rearview mirror system for a vehicle, the electro-optic rearview mirror system comprising:
    an interior electro-optic rearview mirror assembly comprising:
        a first electro-optic element;
        a first light sensor configured to detect an ambient light in an approximately forward direction with respect to a normal operating direction of the vehicle; and
        a second light sensor configured to detect a glare light in an approximately rearward direction with respect to the normal operating direction of the vehicle;
    at least one exterior electro-optic rearview mirror assembly comprising:
        a second electro-optic element;
        a third light sensor configured to detect glare light in an approximately rearward direction with respect to the normal operating direction of the vehicle; and
    a single processor in communication with said first light sensor of the interior electro-optic rearview mirror assembly and also in communication with said third light sensor of the at least one exterior electro-optic rearview mirror assembly, wherein said second electro-optic element is in electrical communication with said processor and said second electro-optic element is configured to change reflectance based upon light received by said first forward facing ambient light sensor located in the interior electro-optic rearview mirror assembly and said third rearward facing light sensor; and
    wherein the reflectance level of said second electro-optic element is also configured to change if said forward facing ambient light sensor detects a low level lighting condition.

11. The electro-optic rearview mirror system of claim 10, wherein said second electro-optic element is configured to change reflectance independent of light received by said second light sensor.

12. The electro-optic rearview mirror system of claim 10, wherein said first electro-optic rearview mirror assembly is an interior rearview mirror assembly and said second electro-optic rearview mirror assembly is an exterior rearview mirror assembly.

13. The electro-optic rearview mirror system of claim 10, wherein each of said second and third light sensors further comprises a secondary optic.

14. The electro-optic rearview mirror system of claim 13, wherein said secondary optic is configured so a horizontal field of view is approximately ten degrees outboard and thirty-five degrees inboard with respect to the origin of the third light sensor.

15. The electro-optic rearview mirror system of claim 13, wherein said secondary optic is configured so a vertical field of view is approximately ten degrees below and fifteen degrees above with respect to the origin of the third light sensor.

* * * * *